United States Patent [19]

Schröder

[11] Patent Number: 5,899,479
[45] Date of Patent: May 4, 1999

[54] ARRANGEMENT FOR ADJUSTING THE ELEVATION OF A SADDLE OF A CYCLE

[76] Inventor: Günter Schröder, Schillerstrasse 7, 66780 Siersburg, Germany

[21] Appl. No.: 08/740,350

[22] Filed: Nov. 8, 1996

[30] Foreign Application Priority Data

Nov. 9, 1995 [DE] Germany ............................ 195 41 760

[51] Int. Cl.⁶ ...................................................... B62K 1/00
[52] U.S. Cl. ...................................... 280/283; 297/215.13
[58] Field of Search ..................................... 280/283, 287, 280/278; 297/215.13

[56] References Cited

U.S. PATENT DOCUMENTS

| | | | |
|---|---|---|---|
| 3,861,740 | 1/1975 | Tajima et al. ............................. | 280/278 |
| 4,226,435 | 10/1980 | Efros ........................................ | 280/283 |
| 4,850,733 | 7/1989 | Shook ................................... | 297/215.13 |
| 5,826,935 | 10/1998 | DeFreitas ............................. | 297/215.13 |
| 5,829,733 | 11/1998 | Becker ..................................... | 248/631 |

FOREIGN PATENT DOCUMENTS

| | | |
|---|---|---|
| 651151 | 4/1936 | Germany. |
| 90 10 926 | 12/1990 | Germany. |
| 4334392 | 4/1995 | Germany. |

*Primary Examiner*—Lanna Mai
*Assistant Examiner*—Faye M. Fleming
*Attorney, Agent, or Firm*—Walter Ottesen

[57] ABSTRACT

The invention is directed to an arrangement for adjusting a saddle of a cycle in elevation. The arrangement includes a saddle support 1 which can be adjusted in elevation and which is mounted in an inclined frame tube 8 of the cycle. The saddle support 1 can be subjected to hydraulic pressure. A hollow body 20 is fixed in the frame tube 8 and receives the support tube 10 of the saddle support 1. The hollow body 20 and the support tube 10 conjointly define a pressure space 201 which is variable in volume. This pressure space 201 can be connected to a pressure medium storage vessel 40 via a remotely-manipulated actuating valve 403.

12 Claims, 2 Drawing Sheets

ARRANGEMENT FOR ADJUSTING THE ELEVATION OF A SADDLE OF A CYCLE

FIELD OF THE INVENTION

The invention relates to an arrangement for adjusting the elevation of a saddle of a cycle such as a bicycle or tricycle. The saddle is attached to a saddle support which includes a support tube or seat post. The support tube is adjustable in elevation relative to and within a rearward inclined frame tube of the cycle. The support tube can be fixed in elevation and can be charged via a hydraulic pressure medium.

BACKGROUND OF THE INVENTION

The saddle of a cycle is usually fixed in elevation by mechanically clamping a saddle support attached to the cycle in the upper portion of the rear inclined frame tube of the cycle. The rear inclined frame tube in a bicycle, for example, is also referred to as the seat tube. The saddle or seat clamp of the cycle frame must be loosened in order to adjust the saddle in elevation. The saddle is moved upwardly or downwardly with the saddle support in the rear inclined frame tube and the clamp of the cycle frame is then again tightened. For each of these activities, reaction forces act upon the frame which usually is held by the person making the adjustment generating the forces. This work can mostly only be performed during standstill of the cycle and with hand tools.

The saddle elevation optimal for the operation of a cycle is an elevation different than the saddle elevation needed at standstill. The elevation at standstill of the cycle permits the cyclist to place both feet on the ground without it being necessary to dismount from the saddle.

Because the adjustment of the saddle elevation is associated with the above-mentioned work, the saddle elevation adjusted on each cycle is a compromise between the requirement of the cyclist, on the one hand, to be able to place both feet on the ground at standstill so that the cyclist must not dismount in order to prevent cycle and cyclist from falling over at standstill and, on the other hand, in order to have the saddle so high that the cyclist can extend the legs in an ergonomically advantageous manner to drive the sprocket via the pedals. The ideal adjustment of saddle elevation for standstill is not the ideal adjustment of the saddle elevation for cycle operation and vice versa.

German Patent Publication 2,900,780 discloses an arrangement with which the elevation of the saddle can be adjusted simpler and more rapidly during standstill of the cycle and when the cyclist has dismounted than was possible with the conventional screw/nut clamp up to that time. While the saddle is fixed very precisely and immovable with respect to the cycle frame with the conventional screw/nut clamp, the arrangement of German Patent Publication 2,900,780 permits only the positioning of the unloaded saddle in a zero position in order to move the same up and down with changing load as is usual during normal cycle operating states. The length of the movements about the zero position is dependent upon the gas pressure in the spring and on the forces acting on the saddle in the longitudinal-axial direction of the arrangement. For this purpose, the arrangement includes a gas pressure spring having a pregiven gas pressure for which a blockable connection is provided between the two gas chambers which are located at both ends of the piston. The blockable connection can release or block the volume flow between the two gas chambers when the piston is charged. In this way, the piston can be positioned between the two end positions "completely down" and "completely up". In each position of the piston above "completely down", the air or gas volume is compressible in each position of the piston above "completely down" and acts resiliently on the vertical saddle movements. The spring paths increase for the piston position "completely up" and the saddle becomes softer.

This arrangement includes a minimum construction size which cannot be built into existing cycle frames.

German Patent 651,151 discloses an arrangement wherein the elevation of the cycle saddle is adjustable at standstill and during operation of the cycle. This arrangement includes an adjustable saddle support which is hydraulically charged and for which two pistons, which operate in a cylinder, are under resilient pressure. A valve can be actuated from the saddle by means of a Bowden cable in order to establish equilibrium of the liquid in two pressure chambers. This adjusting arrangement uses a cylindrical helical spring as an energy store and therefore requires a much longer structural space than a touring cycle allows.

This arrangement includes considerable technical shortcomings which make assembly most complicated and requires a long structural length. Furthermore, for this reason, this arrangement was unsuccessful in the marketplace.

SUMMARY OF THE INVENTION

It is an object of the invention to provide a simpler arrangement for adjusting the elevation of a saddle which is characterized by reduced structural size and simple assembly.

The arrangement of the invention is for adjusting the elevation of a saddle of a cycle having a frame including a rearward inclined frame tube having an open upper end. The arrangement includes: a support tube for supporting the saddle; a hollow body dimensioned to the upper end and to pass into the open upper end and fit tightly in the inclined frame tube; the hollow body having a lower end closed by a first wall and having an upper open end for telescopically receiving the support tube therein; the support tube being mounted in the hollow body so as to be slidably movable therein in seal-tight relationship thereto; the support tube having a lower end closed by a second wall adjacent the first wall; the first wall and the second wall conjointly delimiting a pressure space having a volume within the hollow tube which varies as the support tube slidably moves in elevation in the hollow tube; a pressure medium storage vessel containing energy storage means and a fluid medium and being mounted on the cycle externally of the pressure space; and, means for connecting the pressure medium storage vessel to the pressure space for facilitating the transfer of the fluid medium between the pressure space and the storage vessel for moving the support tube and the saddle in elevation.

The arrangement of the invention essentially comprises the hollow body open at its upper end and the saddle support (which is guided to be movable longitudinally and which extends with the support tube into the hollow body) and the pressure store. The saddle support carries the saddle at its upper end and the pressure store is spatially separate and connected via a hollow line to the hollow body. The lower end of the support tube and the piston surface conjointly define the movable end of the pressure chamber in the hollow body.

The hollow body is filled with hydraulic liquid (preferably vegetable oil) after assembly of the hollow body and of the empty and pressureless storage vessel and after connecting the two via the hollow line. Only now is the support tube of the saddle support guided into the hollow body onto the surface of the hydraulic liquid and pressed thereagainst. The support tube provides a seal with respect to the hydraulic liquid. The actuating valve is now opened and the hydraulic liquid is transported into the storage vessel as long as the actuating valve is open. The saddle support is positioned relative to the hollow body by closing the actuating valve. The saddle support is then secured with suitable components against rotation and with respect to limiting the stroke. Air, for example with an air pump, is pressed into the pressure store via the gas valve until the desired gas pressure is reached above the hydraulic liquid.

If the actuating valve is opened while the saddle support is unloaded, then hydraulic liquid flows from the storage vessel into the pressure chamber of the hollow body and the saddle support lifts. A closure of the actuating valve stops the liquid flow and thereby positions the saddle support and the saddle in elevation. When the saddle support is subjected to load and the actuating valve is closed, a pressure is built up in the pressure space of the hollow body. When the actuating valve is opened, the pressure built up in the pressure space moves the hydraulic liquid against the lower gas pressure into the storage vessel. The gas pressure then increases because of the compression in the storage vessel so that adequate energy is again available to move the unloaded or only slightly loaded saddle support after opening of the actuating valve again in the direction of "high position". To relieve load on the saddle support, the cyclist can stand for a short time on the pedals.

The operation can be repeated as desired. Pressure gas losses and hydraulic liquid losses can be compensated very simply by refilling. The arrangement is preferably driven by vegetable oil so that no environmental damage occurs when there is an oil change or when oil losses occur.

In an advantageous embodiment of the invention, the energy store in the pressure medium storage vessel is a gas located above the hydraulic liquid. Part of the potential energy of the cyclist, which is converted into kinetic energy of the hydraulic fluid when the loaded saddle drops, is utilized to increase pressure of the gas in the pressure fluid storage vessel. In order to ensure that this gas does not reach the pressure chamber of the hollow body, the pressure fluid storage vessel is filled with a certain quantity of a corrosion-reducing hydraulic liquid, whIch is practically incompressible and has a very low vapor pressure. Vegetable oil is preferably used for reasons of environmental protection. Air is used as a gas which stores energy while under increased pressure. The air can be easily introduced with a hand pump until the required pressure is provided. With the pregiven volume of the pressure medium storage vessel and the minimum fill quantity of the hydraulic fluid as well as the highest permissible vessel internal pressure, which is dependent upon the nature of the construction, the user can influence the speed of the adjustment of saddle elevation by changing the charge of the hydraulic fluid and of the gas pressure when the saddle is positioned in high elevation.

In a further advantageous embodiment of the invention, the remote-controllable actuating valve can be actuated from the steering bar of the cycle. With this possibility of remote control, the cyclist can adjust the saddle in elevation during travel. For example, while in the saddle, the cyclist can adjust the saddle lower when he enters an unstable driving situation and must bring the feet quickly to the ground. The cyclist can, without stopping, again adjust the saddle in elevation in that the cyclist lifts the body during travel by standing on the pedals and opens the actuating valve.

According to an advantageous feature of the invention, the remote control of the actuating valve is coupled to a hand brake. Hand brakes usually have a free movement until they engage. With a second Bowden cable, the saddle adjustment can be made effective before the brake responds. In this way, it is possible to already drop the saddle before the speed of the cycle is reduced to the extent that the cycle can no longer be balanced by the cyclist. Furthermore, the saddle can also be adjusted during travel without braking. The hand brake therefore advantageously has a second function.

With the adjusting arrangement of the invention, a rapid adjustment of the saddle of a cycle is possible. The adjustment in elevation can take place in each operating state of the cycle. The danger of an accident for the cyclist is reduced. Existing cycles can be retrofitted with this adjusting arrangement.

BRIEF DESCRIPTION OF THE DRAWINGS

The invention will now be described with reference to the drawings wherein.

Figure 1:
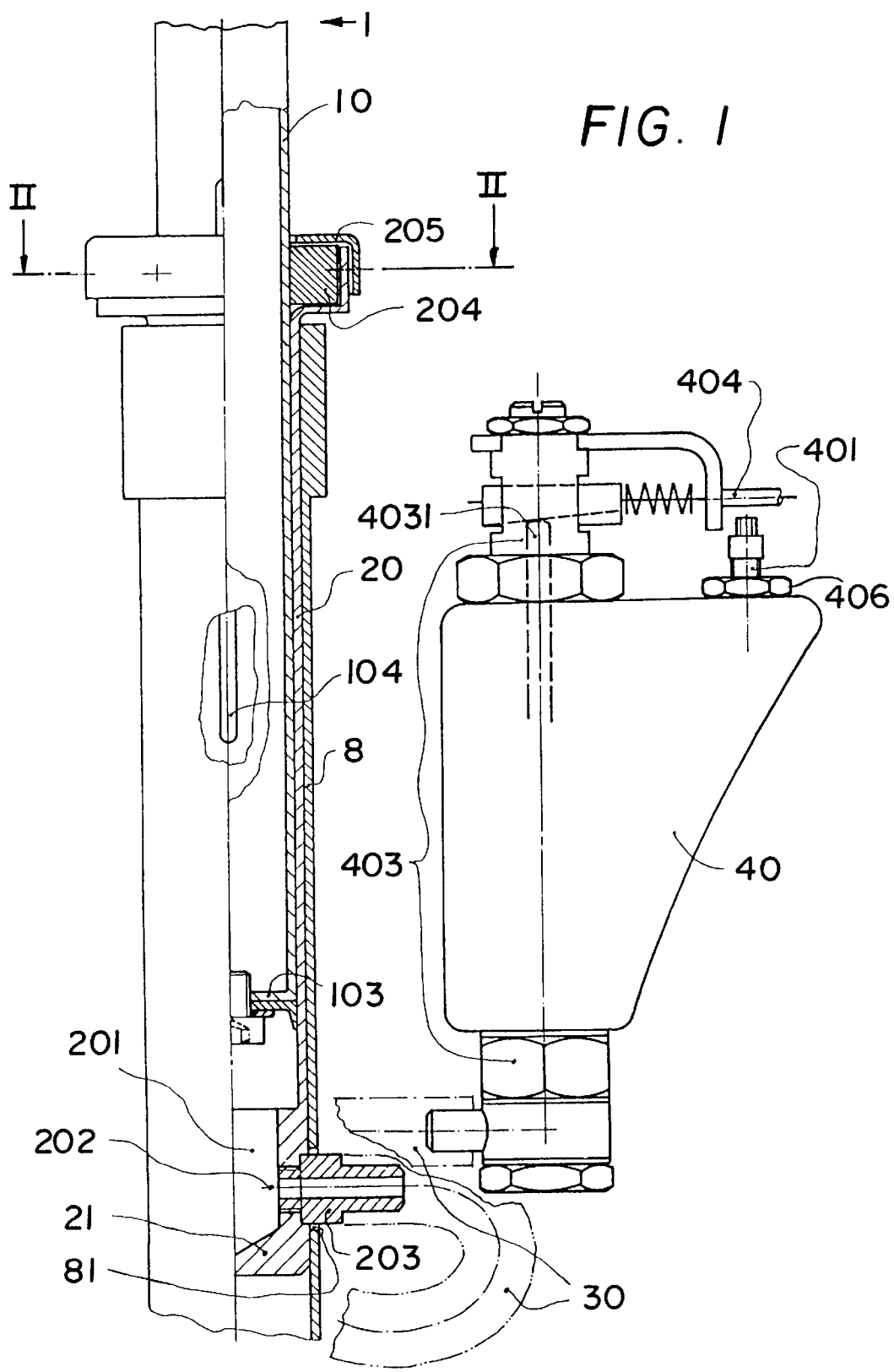
FIG. 1 is a schematic of an embodiment of the arrangement of the invention and shows the saddle support mounted in a frame tubing of a cycle with the saddle omitted; and, FIG. 2 is a section view taken along line II—II of FIG. 1.
Figure 2:
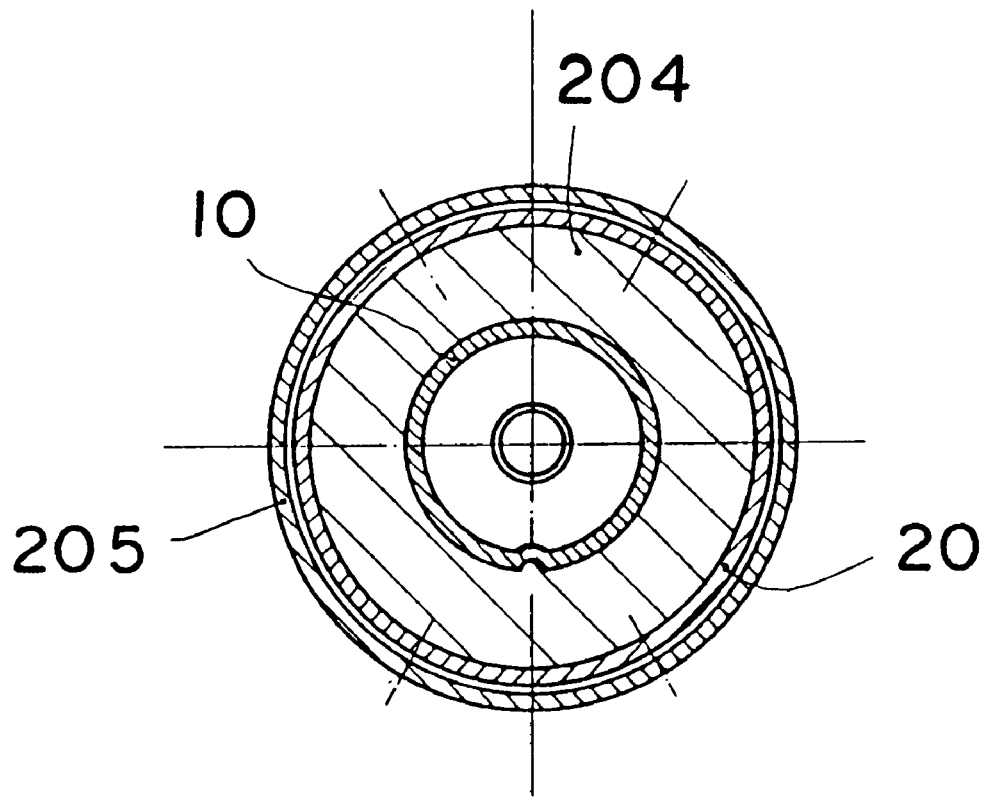

DESCRIPTION OF THE PREFERRED
EMBODIMENTS OF THE INVENTION

The saddle support 1 comprises a support tube 10. The support tube 10 is configured with an axially extending guide slot 104 so that it will not rotate. The lower end of the support tube 10 is closed by a base wall 103 and this base wall defines a surface which can be subjected to pressure.

A hollow body 20 is open at its upper end and is tubularly configured. The support tube 10 is adapted to the hollow body 20 and is mounted therein. The hollow body 20 is closed at its lower end by a base wall 21 and the inner surface of the wall 21 can be charged with pressure.

The saddle support 1 is provided with the guide slot 104 to hold the nose of the saddle constant in a pregiven travelling direction. A guide element 204 is seated in a widening provided in the upper end of the hollow body 20. The guide element 204 is so formed that a rotation of the saddle support 1 is prevented. The guide element 204 is secured against rotation and longitudinal movement by means of cover 205.

The hollow body 20 is fixedly mounted in a frame tube 8 of the cycle frame. The frame tube 8 includes a radial bore 81 which is in alignment with a radial bore 202 in the tube wall of the hollow body 20. A pressure space 201 is delimited by the two base walls 103 and 21 and the inner wall surface of the hollow body 20. The pressure space 201 communicates via the bores 81 and 202 with a pressure medium storage vessel 40.

The pressure space 201 is connected via the line connection means 203 and the pressure line 30 connected thereto to the pressure medium storage vessel 40. The line connecting means 203 is threadably engaged in the bore 202 of the hollow body 20.

The pressure medium storage vessel 40 is a pressure-tight hollow body which is filled via a fill opening with corrosion-reducing liquid, which is practically incompressible and has a low vapor pressure. The storage vessel 40 is filled via a gas valve 401 with a gas. The gas valve 401 is disposed in the screw plug 406 which closes the oil fill opening. The pressure chamber of the storage vessel 40 can be closed and opened at its lower end via an actuating valve 403. A pressure line 30 is connected to this actuating valve 403. The actuating valve 403 is opened and closed via the spring-biased valve shaft 4031 which leads upwardly through the storage vessel 40.

The operation of the arrangement of the invention is described below.

The pressure medium storage vessel 40 is filled with hydraulic liquid and a gas to the extent that, with the aid of the potential energy, which is contained in the gas standing under pressure, a portion of the liquid is pumped through the pressure line 30 into the pressure space 201. In this way, the unloaded assembly (which includes the saddle support 1 and the saddle) can be moved to the highest position permitted by the construction. By closing the actuating valve 403, the flow of hydraulic liquid is stopped and therefore the volume of the pressure chamber 201 and the position in elevation of the saddle is determined.

With the saddle under load, the actuating valve 403 is opened by actuating, for example, a separate Bowden control cable or a Bowden cable 404 connected to the hand brake. When the actuating valve 403 is open, the hydraulic liquid is pressed out of the pressure space 201 into the storage vessel 40 and the gas disposed there as an energy store is compressed. The operation can be repeated as desired. Pressure gas loss and hydraulic loss can be compensated very simply by refilling via the gas valve 401 and the opening in the pressure medium storage vessel 40 which is closed by the screw plug 406 of this valve 401.

When retrofitting the cycle with the arrangement of the invention, the hollow body 20 can be seated in the frame tube 8 and fixed after the frame tube 8 is provided with a bore 81 through which the line connecting means 203 can be threadably engaged. After connecting the line connecting means 203 and the pressure medium storage vessel 40 by means of pressure line 30, the pressure medium storage vessel 40 is attached outside on the frame tube 8 which contains the hollow body 20 and the connection for the remote actuation of the valve 403 is established.

It is understood that the foregoing description is that of the preferred embodiments of the invention and that various changes and modifications may be made thereto without departing from the spirit and scope of the invention as defined in the appended claims.

What is claimed is:

1. An arrangement adjusting the elevation of a saddle of a cycle having a frame including a rearward inclined frame tube having an open upper end, the arrangement comprising:

a support tube for supporting said saddle to which a weight can be applied;

a hollow body dimensioned to said upper end and to pass into said open upper end and fit tightly in said inclined frame tube;

said hollow body having a lower end closed by a first wall and having an upper open end for telescopically receiving said support tube therein;

said support tube being mounted in said hollow body so as to be slidably movable therein in seal-tight relationship thereto;

said support tube having a lower end closed by a second wall adjacent said first wall;

said first wall and said second wall conjointly delimiting a pressure space having a volume within said hollow tube which varies as said support tube slidably moves in elevation in said hollow tube;

a self-contained pressure medium storage vessel containing a fluid medium therein and being mounted on said cycle externally of said pressure space and outside of said inclined frame tube;

means for connecting said pressure medium storage vessel to said pressure space for facilitating the transfer of said fluid medium between said pressure space and said storage vessel; and, said pressure medium storage vessel also containing energy storage means therein for applying pressure to said fluid medium for moving said fluid medium via said connecting means into said pressure space when said weight applies a hydraulic pressure to said fluid medium which is less than said pressure applied to said fluid medium by said energy storage means.

2. An arrangement adjusting the elevation of a saddle of a cycle having a frame including a rearward inclined frame tube having an open upper end, the arrangement comprising:

a support tube for supporting said saddle to which a weight can be applied;

a hollow body dimensioned to said upper end and to pass into said open upper end and fit tightly in said inclined frame tube;

said hollow body having a lower end closed by a first wall and having an upper open end for telescopically receiving said support tube therein;

said support tube being mounted in said hollow body so as to be slidably movable therein in seal-tight relationship thereto;

said support tube having a lower end closed by a second wall adjacent said first wall;

said first wall and said second wall conjointly delimiting a pressure space having a volume within said hollow tube which varies as said support tube slidably moves in elevation in said hollow tube;

a self-contained pressure medium storage vessel containing a fluid medium therein and being mounted on said cycle externally of said pressure space and completely outside of said inclined frame tube;

means for connecting said pressure medium storage vessel to said pressure space for facilitating the transfer of said fluid medium between said pressure space and said storage vessel;

said pressure medium storage vessel also containing energy storage means therein for applying pressure to said fluid medium for moving said fluid medium via said connecting means into said pressure space when said weight applies a hydraulic pressure to said fluid medium which is less than said pressure applied to said fluid medium by said energy storage means;

said fluid medium being a hydraulic liquid and said energy storage means being a gas under pressure within said storage vessel and above said hydraulic liquid; said connecting means including a conduit interconnecting said pressure space and said pressure medium storage vessel;

a remotely-actuated hydraulic valve switchable between a first position wherein said conduit is blocked and a second position wherein said conduit is cleared to permit said hydraulic liquid to flow between said pressure space and said pressure medium storage vessel; and, a gas valve mounted on said storage vessel for permitting quantities of said pressurized gas to be added until a desired gas pressure is reached above said hydraulic liquid whereby said pressurized gas acquires a potential energy for imparting movement to said hydraulic liquid when said hydraulic valve is switched into said second position.

3. The arrangement of claim 2, wherein said cycle has a handle bar and said arrangement further comprises a cable for remotely actuating said hydraulic valve from said handle bar.

4. The arrangement of claim 3, wherein said cycle is a bicycle having a hand brake mounted on said handle bar; and, said cable is coupled to said hand brake.

5. The arrangement of claim 4, said cable being a Bowden cable.

6. A device for adjusting the height of a saddle of a bicycle having a seat tube, the device comprising:

a cylinder and a piston;

said piston defining a longitudinal axis and supporting said saddle;

said cylinder being clamped inside said seat tube;

said cylinder and said piston conjointly defining an interface;

means at said interface for avoiding rotation of said piston and said saddle about said longitudinal axis and for avoiding a blow-out of said piston from said cylinder;

a vessel separate from said cylinder and said piston and said vessel having a hollow space filled with pressure fluid and a compressed compressible, not burning nor dissociating gas;

said vessel having an upper part and a lower part;

a gas valve mounted in said upper part for permitting said gas to be added to said vessel;

a hydraulic valve mounted in said lower part;

a Bowden cable mounted on said bicycle for actuating said hydraulic valve to open and close the same from a predetermined location on said bicycle; and, hydraulic connector means for connecting said hydraulic valve to said cylinder to define a high pressure space extending from inside said cylinder below said lower end of said piston and through said hydraulic connector means to said hydraulic valve.

7. The device of claim 6, said hydraulic connector means being a flexible pressure hose.

8. The device of claim 6, said hydraulic connector means being a metallic or non-metallic tube.

9. The device of claim 6, said hydraulic valve housing being an integral part of said vessel.

10. The device of claim 6, said hydraulic valve housing being mounted on said vessel.

11. The device of claim 6, said compressed gas having direct contact with said pressure fluid.

12. The device of claim 6, said compressed gas having no direct contact with said pressure fluid.

* * * * *